(12) United States Patent
Kovacs

(10) Patent No.: US 6,542,813 B1
(45) Date of Patent: Apr. 1, 2003

(54) SYSTEM AND METHOD FOR AUTOMATIC MANAGING GEOLOCATION INFORMATION AND ASSOCIATED REFERENCES FOR GEOGRAPHIC INFORMATION SYSTEMS

(75) Inventor: Ernö Kovacs, Stuttgart (DE)

(73) Assignee: Sony International (Europe) GmbH, Berlin (DE)

( * ) Notice: Subject to any disclaimer, the term of this patent is extended or adjusted under 35 U.S.C. 154(b) by 0 days.

(21) Appl. No.: 09/532,822

(22) Filed: Mar. 21, 2000

(30) Foreign Application Priority Data

Mar. 23, 1999 (EP) .............................. 99105865

(51) Int. Cl.[7] .................. G06F 17/36; G06F 17/30; G08G 1/13
(52) U.S. Cl. .................. 701/208; 701/209; 340/990; 340/988
(58) Field of Search .................. 701/200, 209, 701/207, 208, 212, 214, 213; 340/990, 995, 988

(56) References Cited

U.S. PATENT DOCUMENTS

| | | | | |
|---|---|---|---|---|
| 5,727,057 A | * | 3/1998 | Emery et al. ............. | 379/211 |
| 5,930,474 A | * | 7/1999 | Dunworth et al. ....... | 395/200.47 |
| 5,966,135 A | * | 10/1999 | Roy et al. ............... | 345/433 |
| 5,974,419 A | * | 10/1999 | Ashby .................... | 707/100 |
| 6,023,223 A | * | 2/2000 | Baxter, Jr. .............. | 340/531 |
| 6,029,173 A | * | 2/2000 | Meek et al. ............. | 707/102 |
| 6,047,234 A | * | 4/2000 | Cherveny et al. ....... | 701/200 |
| 6,073,076 A | * | 6/2000 | Crowley et al. ......... | 701/208 |
| 6,088,648 A | * | 7/2000 | Shah et al. .............. | 701/117 |
| 6,092,076 A | * | 7/2000 | McDonough et al. .... | 707/102 |
| 6,108,365 A | * | 8/2000 | Rubin et al. ............. | 375/130 |
| 6,167,274 A | * | 12/2000 | Smith ..................... | 455/456 |
| 6,181,867 B1 | * | 1/2001 | Kenner et al. ........... | 386/46 |
| 6,236,991 B1 | * | 5/2001 | Frauenhofer et al. .... | 707/6 |

FOREIGN PATENT DOCUMENTS

| | | |
|---|---|---|
| AU | 53031 98 | 8/1998 |
| EP | 0 829 704 | 3/1998 |
| EP | 0 860 787 | 8/1998 |
| WO | WO 98 05019 | 2/1998 |

\* cited by examiner

*Primary Examiner*—Tan Q. Nguyen
*Assistant Examiner*—Dalena Tran
(74) *Attorney, Agent, or Firm*—Frommer Lawrence & Haug LLP; William S. Frommer; Gordon Kessler

(57) ABSTRACT

The present invention relates to the field of geographic information systems (GIS). The invention presents an apparatus and a method for automatic managing a database (1) of geolocation information and for providing this information to geoinformation systems of for example wireless communication systems. According to the present invention an automatic search agent is provided effecting the following steps for managing the database (1):

Figure 1:
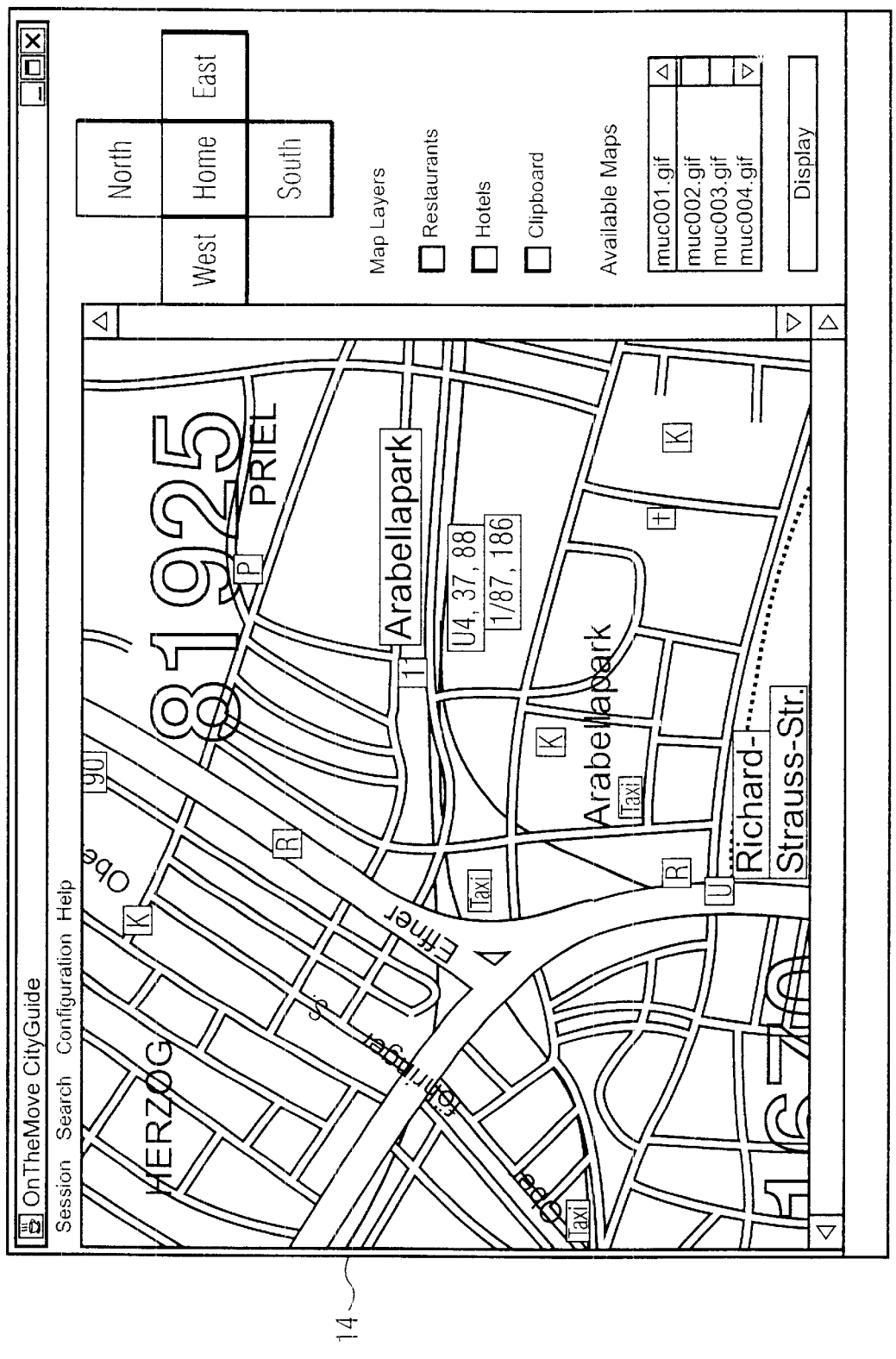

searching (4) nodes of a network,
  detecting (13), if geographical position information and associate information of a location is present at the searched node,
  retrieving the geographical position information and the associated information of the location present at the node of the network, and
  automatically entering the acquired geographical position information and associated information to the geographic information database (1).

29 Claims, 3 Drawing Sheets

SYSTEM AND METHOD FOR AUTOMATIC MANAGING GEOLOCATION INFORMATION AND ASSOCIATED REFERENCES FOR GEOGRAPHIC INFORMATION SYSTEMS

The present invention relates to a method for automatically creating and managing a GIS database, a system for managing geographic information stored in a geographic data base as well as to a mobile device accessing wirelessly such a system.

The presented invention generally relates to the field of geoinformation systems, and more particular to the automatic collection of location information and the dissemination to (mobile) client of (wireless) networks.

Geoinformation systems are systems that manage a database of locations and provide application, which accesses this database to present location-related data to the user. According to known approaches the database is stored locally on the device used to access the information. This can be the local hard disk or a CD-ROM in a CD-ROM device (e.g. in a car navigation system). This has the disadvantage that the database contents is fixed and can not be changed without further efforts (e.g. buying and installing a new CD, downloading a new database copy, etc.)

In the Internet age, geoinformation systems are now accessed over a network (e.g. trip planning systems). With the emerging of wireless wide-area networks (e.g. GSM) and low-cost mobile computers (e.g. notebooks or palmtops), geoinformation system will provide mobile users with information about their current position. This is enforced further by more and more means for the mobile user to determining his current position. For example, the Global Position System (GPS) provides a low-cost automatic means to determine the current position. The GSM system and other wireless networks will provide location information derived from the measurements in the base stations.

Using this information a geolocation database can be queried about interesting locations in the surrounding of a user. The database can be on a server in the network or (partially) replicated between a network server and the current used device (depending for example on the capabilities of the device, e.g. his hard disk space).

One problem of this known technique is that creating and maintaining the geoinformation database is an expensive and very time consuming process. From the perspective of the GIS database owner it is expensive to including a broad range of different locations into the database. He must create the content on its own or contact a lot of different location owner (e.g. shops, museums, banks, etc.) to get the desired information. In addition to the location information, he must manage a lot of addition information special customized for the mobile user. He will further receive a lot of database change request from his customers.

From the view of location owner (e.g. the shop owner), he has to deal with different GIS database providers. So, whenever his information changes, he must inform several database owner which is slow and expensive. Updates are also slow, as a GIS owner might not directly change his database.

From EP-A-0860787 a map display system is known including a plurality of geographic information servers, a geographic information search server and clients, connected to each other through a network. The geographic information search server searches a plurality of geographic information servers and generates a combination list containing information of existential places of the plurality of geographic information servers. The clients obtain a plurality of geographic information from the plurality of geographic information servers designated by the combination list and display the obtained plurality of geographic information while superimposing them so that the coordinates thereof coincide each other on the same screen. The disadvantage of that technique is that the geographic information server can be accessed automatically, however the information stored in the geographic information servers has to be entered by a cumbersome and time consuming work for the user.

Form EP-A-829704 an information display system for vehicle navigation is known. In order to provide a navigation system intelligently providing various information which contains information to vary with time and is expected by the user, without increasing quantity of the information to be transmitted to a terminal mounted on a car, a navigation system is constituted with an information offering equipment and an information display system, and that information offering equipment has an individual information reception means to obtain individual information through a network and a data transmission means to transmit the received information to the information display system, and that information display system has a data receiver receiving the data from the information offering equipment, a map display means, an icon display means displaying the received data on a map, an icon select means and a detailed information display means which displays the detailed information of an icon selected.

Geoinformation System (GIS) manage large databases of information about "locations". A location according to the present description is a place in the real world identified by coordinates. A location might be a single spot, a circular area, a rectangular area, or any other kind of region. Maintaining a GIS database involves the manual entering of new locations, the updating of existing information, and more. A GIS owner has to put a lot of effort into finding new locations, maintaining the old ones and updating out-of-date information.

Furthermore, anybody who wishes to place a location into the GIS database had to contact the GIS database owner, inform him about the location and update him regularly about changes. This requires a lot of effort from both parties involved: the GIS owner and the location owner. Furthermore, there is a high probability of errors during the database content preparation and also a good chance that the information contained in database is already outdated.

Therefore it is the object of the present invention to propose a technique enabling an effective management of GIS databases.

This object is achieved by means of the features of the independent claims. The dependent claims develop further the central idea of the present invention.

According to the present invention therefore a method for automatically managing a GIS database is provided. The GIS database contains at least a geographical position information of locations and an associated information representing at least one feature of each location. Nodes of a network are perpetually or periodically searched. It is detected whether geographical position information an associate information of a location is present at a searched node. The geographical position information and the associated information of the location present at the node of the network is retrieved and automatically entered to the GIS database.

The search, the detection, the retrieval and the entering of the information to the database thereby can be conducted by at least one automatic search agent. In case a plurality of parallel search agents is used, the search speed is enhanced.

The geographical position information can contain a longitude/latitude information of a location.

Geographical position information present at a node of the network in another format than longitude/latitude information can be automatically converted into a longitude/latitude information format.

One of the features of a location stored in the database can be a link to a web page of the Internet.

One of the features of a location can be digital signature.

Before the entering step the retrieved information can be checked for duplicates and/or consistency with entries already present in the geographic information database.

Before the entering step a trust level can be attached to the geographical position information and the associated information of a location.

The GIS database can be stored on a server and can be accessible from mobile devices via a wireless network.

A user can enter information by means of a register interface of the GIS database.

A user can confirm information of the geographic information database by means of a feedback interface.

The present invention furthermore relates to a system for managing geographic information stored in a GIS database, the GIS database containing at least a geographical position information of a location and an associated information representing at least one feature of the location the system comprises an automated search agent for perpetually or periodically searching nodes of a network, for detecting, if geographical position information and associated information of a location is present at a searched node, for retrieving the geographical position information and the associated information of the location present at the node of the network, and for automatically entering the acquired geographical position information and associated information to the GIS database.

The format of the geographical position information stored in the database thereby can be the longitude/latitude information of a location.

Means for converting geographical position information present at the node of the network in another format than the longitude/latitude information format, into the longitude/latitude information format can be provided.

One of the features of a location stored in the database can be a link to a web page of the Internet.

One of the features of a location can be a digital signature.

The automatic search agent can comprise a location checker for checking information retrieved at the node of the network for duplicates and/or consistency with entries already present in the GIS database.

Means for associating a trust level to the geographical position information and associate information of a location can be provided.

When accessing the database only locations with a predetermined trust level can be retrieved.

The GIS database can be stored on a server and can be accessible from mobile devices via a wireless network.

A register interface of the GIS database can be provided such the user can enter information.

According to the present invention furthermore a mobile device is provided which is designed such as to access wirelessly a system as said forth above.

The mobile device can comprise means for detecting the actual position of the mobile device.

The mobile device furthermore can comprise means for displaying locations retrieved from the database, wherein only locations are displayed which have geographical position information which corresponds to the actual position of the mobile device or which lies within a predetermined range around the actual position of the mobile device. Alternatively locations are displayed which have geographical position information which corresponds to a selected position or which lies within a predetermined range around a selected position.

Using the present invention as set forth above, the process of maintaining the correct information about the location is separated from the communication with the database owner. Furthermore the process of inserting the location into the database is automated. The database owner can search for example the Internet or relevant data bases. The users of the database can receive more up-to-date information.

In the following preferred embodiments of the present invention will be explained in detail with reference to the figures of the enclosed drawings.

Figure 2:
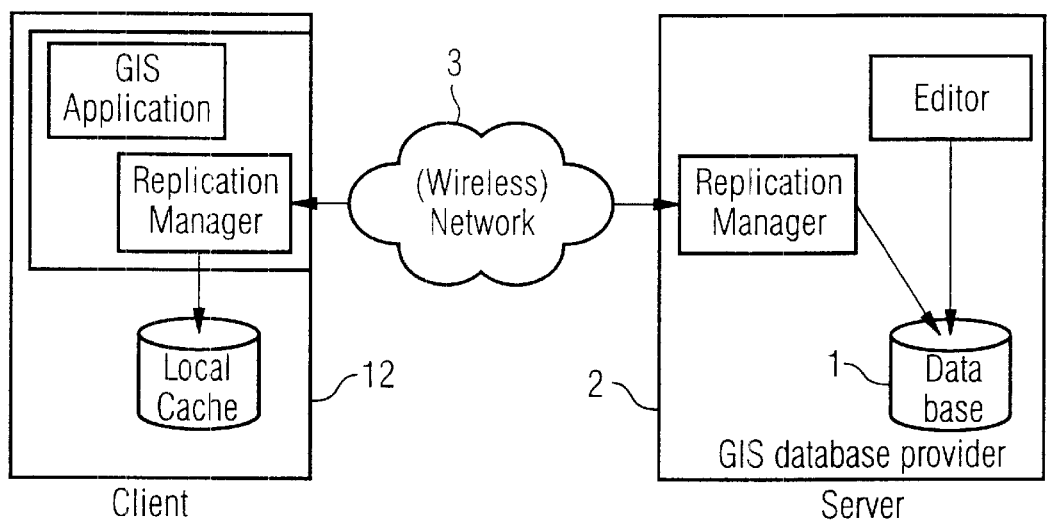
Figure 3:
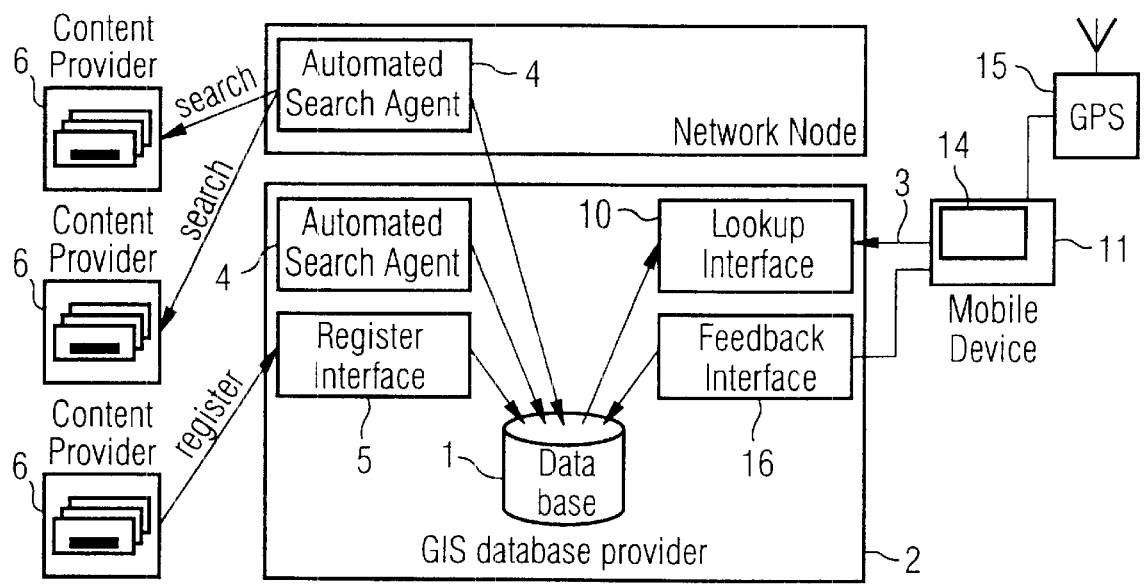
Figure 4:
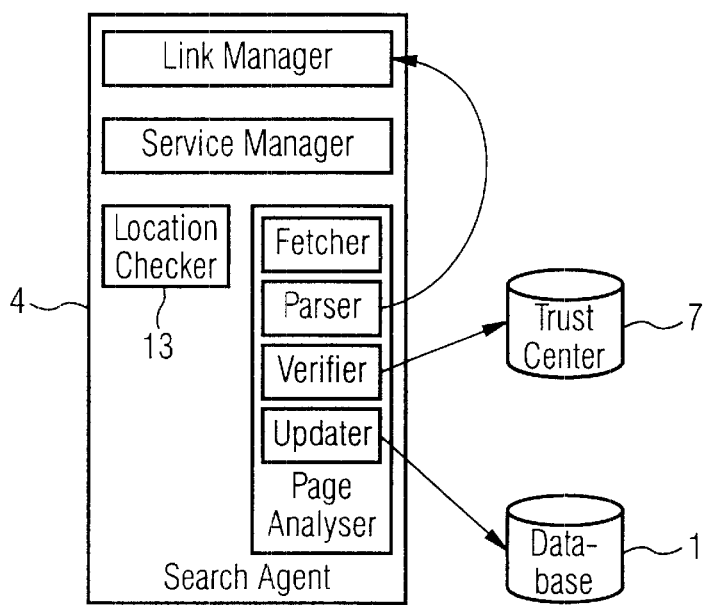
Figure 5:
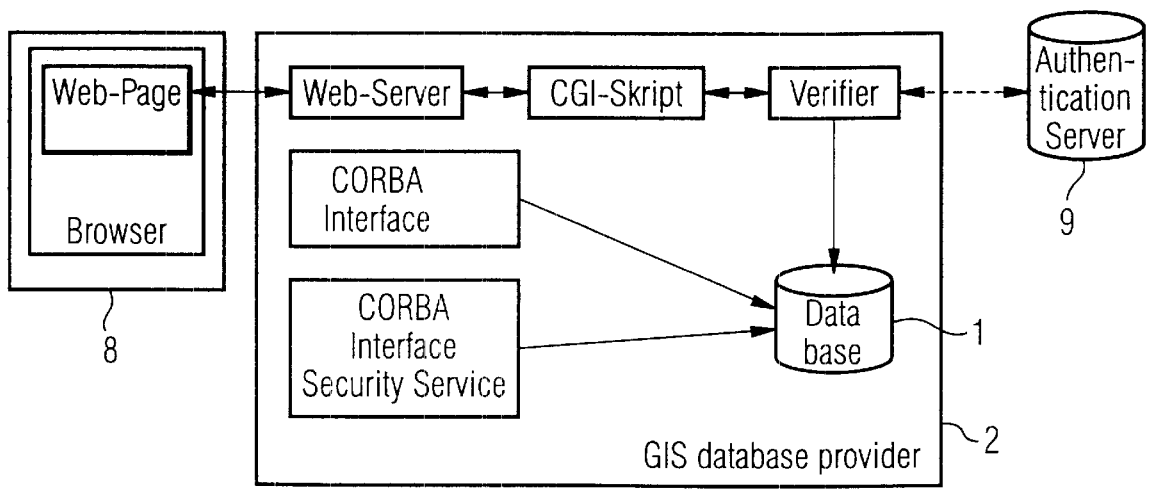

FIG. 1 shows an example of a simple application of the present invention on a mobile device, FIG. 2 shows an example of a distributed system according to the present invention, FIG. 3 shows an example of a database according to the present invention as well as the associated search engine and a register interface, FIG. 4 shows. the internal structure of the automated search agent, and FIG. 5 shows different versions of the register interface, The present invention generally relates to the field of geoinformation systems, more particular to the automatic collection of location information and the dissemination to (mobile) client of (wireless) networks.

Geoinformation Systems are systems that manage a database of locations and provide application, which accesses this database to present location-related data to the user. Originally, the database was stored locally on the device used to access the information. This could have been the local hard disk o a CD-ROM in a CD-ROM device (e.g. in a car navigation system). This had the disadvantage that the database contents was fixed and could not be changed without further invention (e.g. buying and installing a new CD, downloading a new database copy, etc.)

In the Internet age, geoinformation systems are now accessed over the network (e.g. trip planning systems). With the emerging of wireless wide-area networks (e.g. GSM) and low-cost mobile computers (e.g. notebooks or palmtops), geoinformation system will provide mobile users with information about his current position. This is enforced further by more and more means for the mobile user to determining his current position. For example, the Global Position System (GPS) provides a low-cost automatic means to determine the current position. The GSM system and other wireless networks will provide location information derived from the measurements in the base stations.

Using this information a geolocation database can be queried about interesting locations in the surrounding of a user. The database can be on a server in the network or (partially) replicated between a network server and the current used device (depending for example on the capabilities of the device, e.g. his hard disk space).

One problem of this scenario is that creating and maintaining the geoinformation database is a expensive and very time consuming process. From the perspective of the GIS database owner it is expensive to including a broad range of different locations into the database. He must create the content on its own or contact a lot of different owner (e.g. shops, museums, banks, etw.) to get the desired information.

In addition to the location information, he must manage a lot of addition information special customised for the mobile user. He will further receive a lot of database change request from his customers.

From the view of a location owner (e.g. the shop owner), he has to deal with different GIS database providers. So, whenever his information changes, he must inform several database owner which is slow and expensive. Updates are also slow, as a GIS owner might not directly change his database.

FIG. 1 shows an example of an application of the present invention on a mobile device. A map is displayed in a window 14. The user can navigate on the map using the navigation keys in the upper right corner. Some layers of information (e.g. restaurants, hotels, ...) can be added to the map. The user can select different maps.

Alternatively to the navigation on the map by using the navigation keys the actual position of the mobile device, which can for example be detected by a GPS receiver, can be the center point of the displayed map.

FIG. 2 shows an example of a distributed system according to the present invention. A so-called GIS (Geographic Information Systems) database 1 is kept on a server 2 in a network. Clients 12 can access the server 2 over for example wireless networks 3. Using an editor component, the database owner can manipulate the database 1 for the clients. Using an replication manager, the information can be replicated to the client 12. In the client 12 the information can for example be stored in a local cache. The GIS application can access the local cache or can access directly the server 2 by means of the wireless network 3.

FIG. 3 shows an example of a GIS database 1 according to the present invention. Automated search agents 4 search through web pages 6 to locate information related to locations. It is to be noted that a location according to the present description is a place in the real world identified and defined by coordinates. A location can be a single spot, a circular area, a rectangular area, or any other kind of region.

The automated search agents 4 can be located on the same node as the database 1 or on a different node of the Web (network). The register interface 5 allows content providers or other users to register their location or web-pages directly. A mobile device 11 having a display 14 and which can be connected with a GPS receiver 15 can access the database 1 by means of some mobile client and a look-up interface 10.

Whenever a user has accessed a location in the real world and the information of the GIS database 1 has turned out to be correct, the user can confirm the corresponding information of the GIS database 1 by means of a feedback interface 16.

FIG. 4 shows the internal structure of an automated search agent 4. A link manager contains the links which have to be searched (examined). The links are forwarded to a set of server manager who examines a specific server (node of the network). The page analyser fetches a single web page (fetcher) and parses its contents (parser). Links are fed back to the link manager to discover new links. Newly discovered locations are given to the verifier who checks for example the digital signatures of the location searched. A newly found location is forwarded to the GIS database 1 using the updater. The server manager also controls the location checker who periodically checks existing locations on their pages for changes. The verifier of the automated search agent 4 can be connected to a trust center 7 which evaluate the trust (confidence) level of a locations searched and which can attach a corresponding trust level information.

FIG. 5 shows different embodiments for a register interface.

A first possibility is a so-called web-interface. Using a web-interface the required information is entered on a web page 8 using a normal usual web browser. The information is transmitted to the web server and extracted by a CGI script. The CGI script calls the verifier who checks in cooperation with an authentification server 9 the trust level of the information and inserts the information into the database 1.

Another possibility for an implementation of the register interface is the so-called Corba-service. Using a call by interface automated programs then insert location data into the database 1. If the Corba system is equipped with the Corba security service, the register interface can check the identity of the client updating the database.

Geoinformation System (GIS) manage large databases of information about "locations". A location is a place in the real world identified by coordinates. They might be a single spot, a circular area, a rectangular area, or any other kind of region. Maintaining a GIS database involves the manual entering of new locations, the updating of existing information, and more. A GIS owner has to put a lot of effort into finding new locations, maintaining the old ones and updating out-of-date information. Furthermore, anybody who wishes to place a location into the GIS database had to contact the GIS database owner, inform him about the location and update him regularly about changes. This requires a lot of effort from both parties involves: the GIS owner and the location owner. Furthermore, there is a high probability of errors during the database content preparation and also a good chance that the information contained in the database is already outdated.

In the following the present invention will be explained in functional terms:

The information about a location is published in the World Wide Web using a format easy accessible for automated agents. The information provided might not only contain the description of a location, but might also link the information to Web pages so that the geoinformation system can provide addition links for users who want to know more about the location. (e.g. a restaurant owner might not only provide the position of his restaurant but also a link to his daily menu). A location might further be classified according to some predefined categories (e.g. hotel, warehouse, store, automatic teller machine, etc.)

Geoinformation service provides use a special "Search Engine" adapted for the special format provided by the location owners on their web pages. This search engines examine the Web and retrieve the provided locations and store them in the database.

Retrieved locations might be further processed by the GIS system, e.g. by comparing it to the database to detect duplicates or locations at the space geographic place.

In order to ensure that new locations are handled properly, a GIS owner might provide a registration facility allowing the registration of Web pages containing location specific information.

Furthermore, the GIS owner might provide a direct Web-based access to ist GIS database for direct checks by the location owner.

The GIS database provide online updates informing users accessing the GIS applications directly about updates of locations currently used.

The GIS database provides additional mechanisms to counter location spoofing, e.g. digital signature for the location information and trust levels.

To describe the location of a given place, we can put a location description on a Web page. The location description contains the exact location of the place together with additional information describing the place, linking it to other Web pages, and more.

For example, a location can be described through the following information:

| Keyword | Description |
| --- | --- |
| Location.Position | The longitude/latitude information of a location |
| Location.Name | A short name of the location |
| Location.Categories | A list of categories describing the location |
| Location.Long Description | A long description of the location |
| Location.Link | A link to a Web page describing the location |
| Location.Owner | The owner of the place |
| Location.Icon | A link to a icon describing the location |
| Location.Picture | A link to a picture about the location |
| Location.Signature | A digital signature from the owner of the location. The signature verifies the validity of the Location information. |

Some of the above described information are optional and might not be present at every occasion.

To include the location information into a Web page, a Web author and the GIS database owner must agree on a common data format. The following list explains some of the options (Note that the following list shows only examples and other or additional issues can be used):

1. HTML META-Tags

Meta-Tags on a Web-Page allows the author to add addition descriptive information to a Web page in the form of key/value pairs. The keyword in column 1 of above table can be used for this purpose.

Example: <META NAME=Location.Position CONTENT="45.5678 40.6789">

2. XML-DTD Structure

If the Web-page is already designed using XML, the XML document type description (DTD) can be extended to allow location objects on the Web page. The following XML-DTD definition can be used as part of a complete DTD:

<!ELEMENT Location (Location.Position|Location.Name?|
    Location.Categories?|Location.LongDescription?|Location.Link?
    |Location.Picture?|Location.Signature?>
    <ELEMENT Location.Position (%number, %number)>
    <ELEMENT Location.Name (%text)*>
    <ELEMENT Location.Categories (%text)*>
    <ELEMENT Location.LongDescription (%text)*>
    <ELEMENT Location.Link (A)>
    <ELEMENT Location.Picture (A)>
    <ELEMENT Location.Signature (#PCDATA)>

3. Free Form

In the Free Form, the location information is put in an unstructured or semi-structured way on the Web page. An automated agent accessing the Web page must parse and identify the structure. Free form representations contain the danger that the data will not be recognized by the GIS database owner or will be wrongly read.

An automated agent (a search engine) can walk through the network of interconnected pages and retrieve the information stored on the Web pages. When the search engine finds a location information, it retrieves the above described attributes and inserts them into the GIS database.

After that, the search engine checks periodically the retrieved page and updates the database if entries have been changed.

The GIS database might provide a communication interface were location owner can register Web-Pages to be visited by the Search Engine. The Register Interface can be realized in several different ways:

1. Web-Page

The Register Interface can be realized as a Web page using HTML forms for registering the Web page. Instead of the HTML form, a Java or JavaScript applet can be used.

2. CORBA-Interface

The GIS database can provide a CORBA interface for automatic registration of Web interfaces through a automatic agent.

A Lookup-Interface might provide location owners with the ability to check his entry. The Lookup interface might provide means to search for locations depending on the geographic position, the owner's name and other means.

Locations discovered by the search engine agent or entered through the Register interface are further prepared by the GIS database provider before inserted into the database. This processing steps might involve checking the database for duplicates, checking for consistency (e.g. whether a new location is at the same geographic location than another location, etc.)

Using the above described mechanism for automatic location retrieval can be used for location spoofing. For example: the information given in the Web page can be manipulated in order to place a certain object at a specific spot of the map. For example, a restaurant chain might put their location at places near the restaurants of their competitors.

The GIS database protects against this behavior by adding a level trust to the retrieved location. During retrieval, the user can define which level of trust he accepts. The user interface of the GIS application can signal untrustworthy information through special means, e.g. by coding the trust level in color or by displaying the trust level upon selection.

The trust level is influenced by the means how a location information was acquired.

If it was entered by an anonymous client through the Register Interface or retrieved from Web pages, the information is classified as "low".

If the information was added by a registered user (e.g. using an authenticated communication means) or from a authenticated Web page, e.g. through a digital signature on the Web page, the location is classified with a trust level of "high".

Using a feedback channel of the feedback interface 16 to the GIS database 1, customers of the GIS database 1 can indicated that a given location is a real location and/or the corresponding information of the GIS database 1 is correct. In this case, the trust level is raised to "verified" together with a index indicating how often a location was verified.

Using another feedback channel of the feedback interface 16 gives users of the GIS database the means to indicate to the GIS database owner that a specific location was not found at the specific geographic location. This would reduce the trust level of the location.

The main advantages of the present invention can be summarized as following:

Independent publishing of location information on the Web,

Automatic search of interesting information using "Search Engine" techniques,

Automatic maintenance of the GIS database content, and

Security means against "location-spoofing".

What is claimed is:

1. Method for automatically managing a geographic information database, the geographic information database containing at least a geographical position information of a location and an associated information representing at least one feature of the location, comprising the steps of:

searching nodes of a network periodically to update the geographical positional information and the associated information, detecting, if the geographical position information and the associated information of a location is present in a document at a searched node of said network, retrieving the document containing the geographical position information and the associated information of the location present at said searched node of said network, parsing the document to acquire the geographical position information and the associated information, automatically storing the acquired geographical position information, associated information and a pointer to the document in the geographic information database, and periodically rechecking the document at the searched node of a network for changes in the geographical position information and associated information.

2. Method according to claim 1, characterized in that the searching (4), detecting (13), retrieving and entering step is conducted by one or a plurality of automatic search agents (4).

3. Method according to claim 1, characterized in that the geographic position information contains the longitude/latitude information of a location.

4. Method according to claim 3, characterized in that geographical position information present at a node of the network in an other format than longitude/latitude information is automatically converted into a longitude/latitude information format.

5. Method according to claim 1, characterized in that one of the features of a location stored in the database is a link to a web page (8).

6. Method according to claim 1, characterized in that one of the features of a location is a digital signature.

7. Method according to claim 1, characterized in that before the entering step the retrieved information is checked (7) for duplicates and/or consistency with entries already present in the geographic information database (1).

8. Method according to claim 1, characterized in that before the entering step a trust level is attached (7) to the geographical position information and associated information of a location.

9. Method according to claim 1, characterized in that the geographic information database (1) is stored on a server (2) and is accessible from mobile devices (11) via a wireless network (3).

10. Method according to claim 1, characterized in that a user can enter information by means of a register interface (5) of the geographic information database (1).

11. Method according to claim 1, characterized in that a user can confirm information of the geographic information database (1) by means of a feedback interface (16).

12. Method according to claim 1, characterized in that the geographical position information is described in a HTML META-Tag format.

13. Method according to claim 1, characterized in that the geographical position information is described in a XML-DTD format.

14. Method according to claim 1, characterized in that the geographical position information is described in a free form format.

15. System for managing geographic information stored in a geographic information database, the geographic information database containing at least a geographical position information of a location and an associated information representing at least one feature of the location, wherein the system comprises an automated search agent for:

searching nodes of a network periodically to update the geographical positional information and the associated information, detecting, if the geographical position information and the associated information of a location is present in a document at a searched node of said network, retrieving the document containing the geographical position information and the associated information of the location present at said searched node of said network, parsing the document to acquire the geographical position information and the associated information, automatically storing the acquired geographical position information, associated information and a pointer to the document in the geographic information database, and periodically rechecking the document at the searched node of a network for changes in the geographical position information and associated information.

16. System according to claim 15, characterized in that the format of the geographical position information stored in the database (1) is the longitude/latitude information of a location.

17. System according to claim 16, characterized by means for converting geographical position information present at a node of the network in an other format than the longitude/latitude information format, into the longitude/latitude information format.

18. System according claim 15, characterized in that one of the features of a location stored in the database (1) is a link to a web page (8).

19. System according to claims 15, characterized in that one of the features of a location is a digital signature.

20. System according to claim 15, characterized in that the automatic search agent (4) comprises a location checker (13) for checking information retrieved at a node of the network for duplicates and/or consistency with entries already present in the geographic information database (1).

21. System according to claim 15, characterized by means (7) for associating a trust level to the geographical position information and associated information of a location.

22. System according to claim 21, characterized in that when accessing the database (1) only locations with a predetermined trust level are retrieved.

23. System according to claim 15, characterized in that the geographic information database (1) is stored on a server (2) and is accessible from mobile devices (11) via a wireless network (3).

24. System according claim 15, characterized by a register interface (5) of the geographic information database (1) such that a user can enter information.

25. System according to claim 15, characterized by a feedback interface (16) such that a user can confirm information of the geographic information database (1).

26. Mobile device, characterized in that it is designed to access wirelessly a system according to claim 15.

27. Mobile device according to claim 26, characterized by means (15) for detecting the position of the mobile device (11).

28. Mobile device according to claim 27, characterized by means (14) for displaying locations retrieved from the database (1), wherein only locations are displayed which have a geographical position information which corresponds to the actual position of the mobile device (11) or which lies within a redetermined range around the actual position of the mobile device (11).

29. Mobile device according to claim 27, characterized by means (14) for displaying locations retrieved from the database (1), wherein only locations are displayed which have a geographical position information which corresponds to a preselected position or which lies within a predetermined range around the preselected position.

* * * * *